United States Patent [19]

Kupperman et al.

[11] 4,167,156

[45] Sep. 11, 1979

[54] REFLECTIVE ANIMAL LEASH

[75] Inventors: Sam Kupperman, Chicago; Dennis Kupperman, Glenview, both of Ill.

[73] Assignee: RB Toy Development Co., Skokie, Ill.

[21] Appl. No.: 814,191

[22] Filed: Jul. 11, 1977

[51] Int. Cl.² ............................................. A01K 27/00
[52] U.S. Cl. ................................................... 119/109
[58] Field of Search ........................ 119/109; 43/42.33

[56] References Cited

U.S. PATENT DOCUMENTS

| 2,196,627 | 4/1940 | DeSanctis | 119/109 X |
| 3,072,097 | 1/1963 | Morchand | 119/109 X |
| 3,122,853 | 3/1964 | Koonz et al. | 43/42.33 X |
| 3,871,336 | 3/1975 | Bergman | 119/109 X |

Primary Examiner—Louis G. Mancene
Assistant Examiner—Daniel J. Leach
Attorney, Agent, or Firm—Vogel, Dithmar, Stotland, Stratman & Levy

[57] ABSTRACT

An animal leash including an elongated leather strip on which there is sewn a transparent polyvinyl chloride strip having a prism design on one surface thereof and an opaque polyvinyl chloride strip secured to the one surface of the transparent strip. The combined polyvinyl chloride strips are sewn to the leather strip resulting in a leash having a light reflective surface. The areas around the stitching are crimped thereby increasing the reflecting angle of the polyvinyl chloride.

6 Claims, 3 Drawing Figures

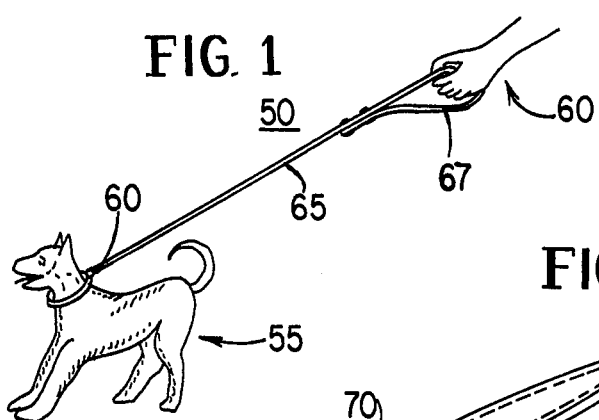
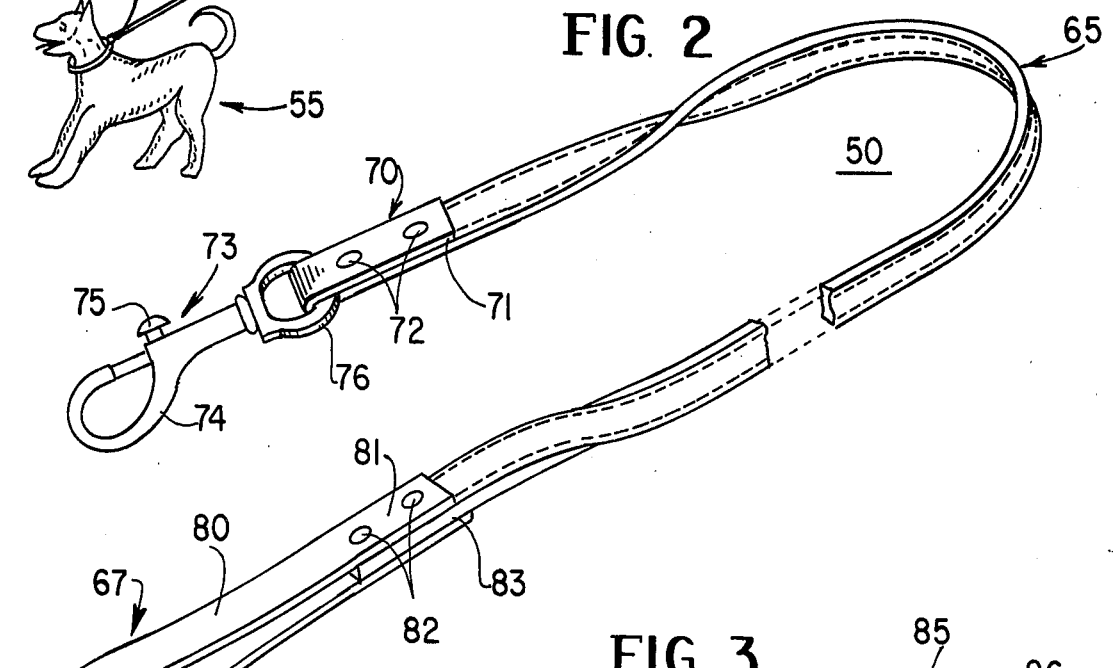
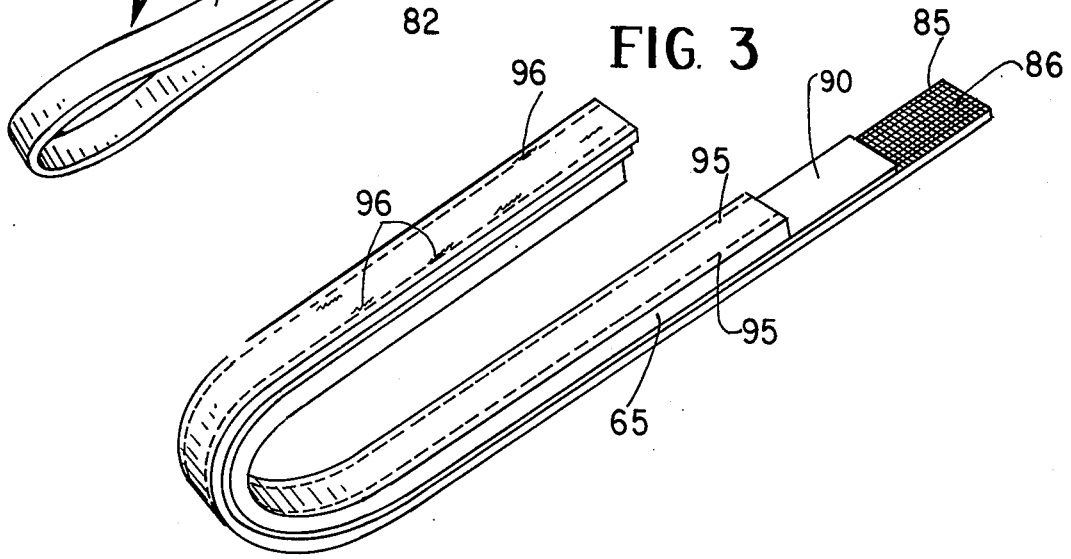

REFLECTIVE ANIMAL LEASH

BACKGROUND OF THE INVENTION

Municipalities throughout the country are more and more requiring that pets, and particularly dogs, be leashed when taken out for walks or are otherwise away from the owner's property. A problem arises when the pet is walked at night, since motorists often cannot see either the pet or the owner who is walking the pet. It has long been known that a reflective leash would be desirable, but for various reasons such a reflective leash has not been possible. In lieu of this, various articles of clothing and collars have been produced for both dogs and cats utilizing various light reflecting materials.

However, the preferred method for identifying to the oncoming motorist both the pet and the person walking the pet would be to provide a light reflective leash. The problems inherent in producing such a light reflective leash reside in the length, flexibility and stretch requirements in the leash, all of which make securing the light reflective material to the leash a difficult problem. Particularly, stretching has been a problem with dog leashes, since most adhesives do not adhere well under the severe tensile stress to which a dog leash is subjected. These problems have been obviated by our invention which permits a light reflective material to be secured to an elongated animal leash while retaining flexibility and stretchability of the leash, and, surprisingly, at the same time increasing the angle of reflectivity of the material used.

SUMMARY OF THE INVENTION

The present invention relates to an animal leash and more particularly to a light reflective animal leash.

An important object of the present invention is to provide a light reflective animal leash in which the light reflective material is secured to the leash in such a manner as to retain stretchability and flexibility of the leash while at the same time providing a wider angle of light reflectiveness than heretofore possible.

Another object of the present invention is to provide an elongated leather strip having an attachment end and a handle, a transparent polyvinyl chloride strip having a prism design on one surface thereof for reflecting light therefrom, an opaque polyvinyl chloride strip secured to the one surface of the transparent strip, a plurality of stitches securing the leather strip and the combined polyvinyl chloride strips with the leather and opaque strips abutting, the stitching extending longitudinally of the strips and providing crinkled surfaces in the transparent polyvinyl chloride strip to increase the reflective angle thereof.

A still further object of the present invention is to provide a reflective leash of the type set forth in which the light reflective material is dielectrically heat sealed or sonic welded to the opaque backing thereby to provide a unitary plastic material for sewing to the leather substrate.

These and other objects of the present invention will be more readily understood by reference to the following specification taken in conjunction with the drawings, in which:

BRIEF DESCRIPTION OF THE DRAWINGS

FIG. 1 is a perspective view of the animal leash of the present invention attached to a dog;

FIG. 2 is an enlarged perspective view of the animal leash illustrated in FIG. 1 particularly illustrating the attachment end and the handle end of the leash; and FIG. 3 is an enlarged view partially broken away of a section of the animal leash illustrated in FIG. 2 particularly showing the three layers thereof.

DESCRIPTION OF THE PREFERRED EMBODIMENT

Referring now to the drawings, there is disclosed a leash 50 connected to a dog 55 and held by a user 60. The leash 50 includes an elongated leather strap 65 connected at one end to a dog collar and secured to a handle 67 at the other end. Referring specifically now to FIG. 2, there is disclosed the leash 50 in which the front end 70 consists of a loop 71 formed of overlying portions of the leash 50 connected together by rivets 72. A metal snap 73 includes a semicircular hook portion 74 having a sliding bolt 75 closing the open end of the hook 74. A connecting ring 76 fits within the loop formed by the overlapped ends 71 and serves to connect the metal snap 73 with the strap 65 of the leash 50. The handle 67 is formed of a loop 80 which may be of the same general material as the strap 65, which loop 80 is provided with overlapping ends 81 having the distal end portion of the strap 65 positioned between. Spaced apart rivets 82 serve to interconnect the handle and the strap 65 to form the leash 50.

Referring now to specifically FIG. 3, there is disclosed the spaced relationship between the leather strap 65 and a transparent strip of polyvinyl chloride 85. The polyvinyl chloride 85 has provided in the rear surface thereof a reflective design or an imprint of cube corner reflectors denoted at 86. Sealed to the surface on which the design 86 is provided, is an opaque polyvinyl chloride backing strip 90, the preferred method of sealing the strip 90 to the strip 85 is by sonic welding, although dielectric heat sealing can also be used. This bonds the strip 90 to the strip 85 such that they cannot be peeled one from the other. The combined strips 85 and 90 are then stitched to the leather strap 65 in two spaced apart longitudinally extending rows of stitches 95. During the stitching operation, the area of the transparent polyvinyl chloride strip around the stitches 95 are deformed as at 96 thereby increasing the reflective angle of the transparent polyvinyl chloride strip 85.

Sewing the combined strips 85 and 90 to the leather backing, results in several advantages not hereinbefore expected. Primarily, sewing permits full flexibility of the leather straps 65 and the polyvinyl chloride combination 85-90 without the stress deformation usually inherent when adhesives or other types of securement have been used in the past. An additional and totally unexpected feature of the present invention is the additional angular reflection of the strip 85 due to the deformation in the areas of the holes punched into the material during the sewing operation. The widening of the angle of reflectivity is an unexpected and highly desirable result which increases the angle through which light is reflected thereby making the leash a safer product for use at night.

While the present invention has been described with respect to an animal leash 50, it will be readily seen that it may be used whenever an elongated strip is necessary, but in its preferred embodiment, it is specifically intended for use as a leash, since the stretching uses of dog leashes have heretofore presented problems in the art not solved.

While there has been described what at present is considered to be the preferred embodiment of the present invention, it will be understood that various modifications and alterations may be made therein without departing from the true spirit and scope of the present invention and it is intended to cover in the appended claims all such modifications and alterations.

What is claimed is:

1. An animal leash comprising an elongated leather strip having an attachment end and a handle, a transparent polyvinyl chloride elongated and flexible strip having a prism design on one surface thereof for reflecting light therefrom, an opaque polyvinyl chloride flexible strip secured to the one surface of the transparent strip and coextensive in length therewith, a plurality of stitches securing said leather strip and said combined polyvinyl chloride strips with the leather and opaque strips abutting, said stitching extending longitudinally of said strips and providing crinkled surfaces in said transparent polyvinyl chloride strip to increase the reflective angle thereof.

2. The animal leash set forth in claim 1, wherein said opaque strip is bonded to said transparent strip by sonic welding to form a unitary strip.

3. The animal leash set forth in claim 1, wherein said opaque strip is bonded to said transparent strip by dielectric heat sealing to form a unitary strip.

4. The animal leash set forth in claim 2, wherein said unitary strip has a length substantially coextensive with said leather strip.

5. The animal leash set forth in claim 1, wherein said stitches are in two elongated parallel rows from one end of the leather strip to the other end.

6. The animal leash set forth in claim 1, and further comprising a metal clip connected to the attachment end.

* * * * *